United States Patent
Bernt et al.

[11] Patent Number: 5,558,707
[45] Date of Patent: Sep. 24, 1996

[54] FIRE DOOR CORE

[75] Inventors: Jorgen O. Bernt, Oakville; Kevin B. Langille, Burlington, both of Canada

[73] Assignee: J.O. Bernt & Associates Limited, Mississauga, Canada

[21] Appl. No.: 457,137

[22] Filed: Jun. 1, 1995

Related U.S. Application Data

[63] Continuation-in-part of Ser. No. 247,249, May 23, 1994, abandoned.

[51] Int. Cl.⁶ ........................... C04B 11/00
[52] U.S. Cl. ............... 106/677; 106/680; 106/772; 106/778; 106/820; 428/703; 428/920; 524/8
[58] Field of Search ............... 106/677, 680, 106/772, 773, 774, 778, 820, 672; 52/785, 799; 428/920, 921, 70, 71, 703; 524/8; 264/333

[56] References Cited

U.S. PATENT DOCUMENTS

| | | | |
|---|---|---|---|
| 2,200,155 | 5/1940 | Camp et al. | 106/680 |
| 2,803,575 | 8/1957 | Riddell | 106/680 |
| 2,979,415 | 4/1961 | Taylor | 106/680 |
| 3,133,729 | 5/1964 | Albert | 106/672 |
| 3,272,765 | 9/1966 | Sefton . | |
| 3,819,391 | 6/1974 | Sefton . | |
| 3,841,886 | 10/1974 | Burr | 106/772 |
| 3,869,295 | 3/1975 | Bowles et al. . | |
| 3,902,911 | 9/1975 | Messenger | 106/672 |
| 3,990,936 | 11/1976 | Geschwender . | |
| 4,040,855 | 8/1977 | Rady-Pentek et al. . | |
| 4,057,526 | 11/1977 | de Rook . | |
| 4,081,283 | 3/1978 | Lankard et al. | 106/680 |
| 4,159,302 | 6/1979 | Greve et al. | 264/333 |
| 4,306,395 | 12/1981 | Carpenter . | |
| 4,328,178 | 5/1982 | Kossatz | 106/680 |
| 4,330,589 | 5/1982 | Saito et al. | 106/680 |
| 4,343,127 | 8/1982 | Greve et al. | 52/785 |
| 4,398,958 | 8/1983 | Hodson et al. . | |
| 4,611,450 | 9/1986 | Chen . | |
| 4,748,771 | 6/1988 | Lehnert et al. | 428/920 |
| 4,752,538 | 6/1988 | Bounini . | |
| 4,895,598 | 1/1990 | Hedberg et al. | 106/694 |
| 5,305,577 | 4/1994 | Richards et al. | 52/799 |

FOREIGN PATENT DOCUMENTS

| | | | |
|---|---|---|---|
| 0306101 | 7/1971 | U.S.S.R. | 106/672 |
| 0981283 | 12/1982 | U.S.S.R. | 106/672 |

*Primary Examiner*—Paul Marcantoni

[57] ABSTRACT

A core for fire doors comprises hydrated gypsum occupying about 40% to 46% of the core volume and bubbles occupying almost all the core volume which is not gypsum. The bubbles preferably comprise about 31% to 38% by volume of larger bubbles of between 1 and 4 mm and about 17% to 25% of smaller bubbles between 0.01 mm and 0.25 mm. The larger bubbles are formed using styrene spheroids.

8 Claims, 1 Drawing Sheet

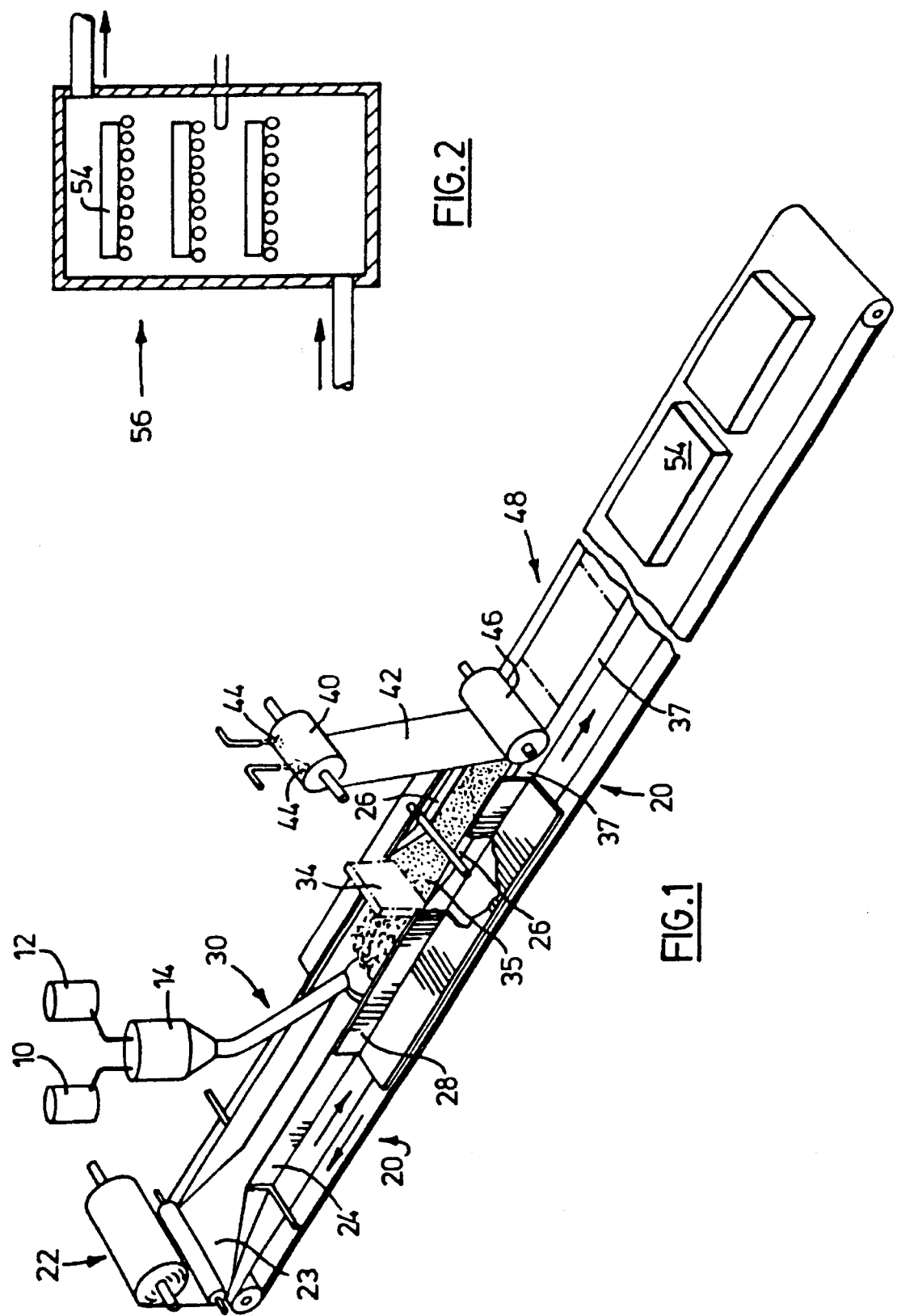

FIRE DOOR CORE

This application is a Continuation in Part of application Ser. No. 08/247,249 filed May 23, 1994, now abandoned.

This invention relates to a core for fire doors

A core for fire doors is contained in a door shaped shell, usually, of steel. The core is customarily bonded or glued to both inside surfaces of the door. Such a shell and core must pass tests before being approved for use in both Canada and the U.S. and in other jurisdictions. A typical test might be: (1) to be subjected to a temperature approaching 1000° C. on one side of the door and to maintain the temperature on the other side of the door to less than 250° C. for at least 60 minutes. (2) Then to maintain its structural integrity as a door for a further 30 minutes.

The parameters of criteria for the door construction differ for tests (1) and (2). During test (1) the heat differential across the door, requires the core to have qualities which inhibit heat transfer which, in turn, causes differential thermal expansion of the steel, and bowing of the panels, on the high temperature side of the door, which threatens the structural integrity of the door. Because of this threat to the structural integrity of the door, it is desireable after test (1) is completed, in accord with the concepts of this invention, that the temperature differential across the door be reduced so that the core, which in test (1) was asked to reduce heat flow, is in step (2), asked to allow more heat flow, to reduce the differential expansion between hotter and cooler panels to maintain the door shape integrity. In addition, for its ordinary function as a door, the door must be as light as possible, a heavy core would require correspondingly stronger mounting frame, supports, hinges etc. Currently the industry requires a core weighing 20–24 lbs./cu.ft.

It is thought by those skilled in the art that a core could be constructed from a gypsum slab which would pass at least test (1) above. However the weight of such a core would be excessive, requiring correspondingly heavy mounting and fitting. Moreover the heat capacity of the gypsum slab might inhibit heat transfer, and interfere with our concept of maintaining door integrity, after an initial period, by allowing heat flow.

(There are many tests, with value and parameters differing from the test set out above. Thus the test above referred to is not intended to limit the scope of the invention and in fact doors within the scope of the invention may be designed to pass less or more rigorous tests. The test outlined merely serves as an example of a core which during a fire must resist transverse heat transfer for an initial period and transfer heat during a following period.)

Other existing fire doors, of which we know, have a core formed principally of mineral fibres with a bonding agent.

Such cores, because of their powdery surfaces have poor bonding characteristics and tend to separate from the door inside surfaces to which they were glued. They also tend to crumble and disintegrate over time, especially when the core separates from the door skins.

This invention comprises a fire door core comprising a mixture of hydrated gypsum in amounts of about 40% to 46% of the core volume, other solid components of up to about 1%, and bubbles as hereinafter described occupy substantially the balance of the core volume.

The upper limit for the percentage by volume of hydrated gypsum is primarily set by the risk of excess weight of the core resulting in overstrain of the mountings and fittings, and the risk of excess heat capacity in the core inhibiting heat flow therethrough when such heat flow is desired to maintain the integrity of the core.

The lower limit for the percentage by volume of hydrated gypsum is primarily set by the necessity of a sufficient endothermic value for the hydrated gypsum. The total endothermic value of removing the combined water in gypsum is 1418 BTU per pound of water.

By "bubbles" herein, we mean spaces in the mix which are frequently spheroidal. Such spaces may be created by any desired method including: (1) inserting in the mix hollow spheres of the desired diameter. This is the preferred method where the diameter of such bubbles is 1–4 mm. Such spaces may also be created by (2) mixing a foaming agent in the mix. This is the preferred method where the diameter of such bubbles is 0.01 mm to 0.25 mm. The foaming agent is mixed as lately as possible before the mixing because the bubbles in unmixed form tend to deteriorate with time. (3) Large "bubbles" as the term is used herein may be formed by including waterswollen particles, such as tapioca which, when the slab containing said particles is heated to drive off the water, lose their water content to leave a void or "bubble" only slightly less than that of the swollen tapioca. Production of large bubbles in this way, is not favored because of the extra energy required to drive off the contained water.

Producing the large (ie. with diameters at 1–4 mm) bubbles has not been successful using vermiculite and perlite. Both materials were screened to 1–5 mm size particles. The sample core materials core produced with perlite and vermiculite were both too heavy. Moreover the sample produced with vermiculite was too weak, and it is believed that this was due to the "leafy" nature of the expanded vermiculite. An additional problem encountered with both perlite and vermiculite was their water absorbancy. It was necessary to add 20%–40% (the exact amount varies with the gradation and quality of perlite or vermiculite) more water than would otherwise be required. The additional water was undesireable because its presence increased the cost of drying and, for a given production rate, the capital cost of the dryer.

Other attempts to produce the large air bubbles. Large air bubbles were produced using a commercial foaming agent e.g. Cedepal™ and compressed air. However, when such agent with larger bubbles is added to the mix the large bubbles are converted to bubbles of much smaller size, e.g. 0.01–0.25 mm dia. This is believed to be due to the large shear velocities required to mix gypsum and water. It is noted that such conversion of large to small bubbles occurred even when the mix with large bubbles was added near to the end of the mixing cycle.

Best results in the provision of large bubbles in the mix have been achieved when hollow styrene spheroids are used. These are quite uniform and, in typical batches have a median diameter of 2.5 mm and about 80% of the spheroids have been found to be between 2.2 and 3 mm.

Tests have shown that too high a percentage of small bubbles will sufficiently weaken the core to prevent its maintaining its shape during handling and use. Tests have further shown that too high a percentage of large bubbles will also reduce the strength of the core and prevent its maintaining its shape during handling and use. The limits indicated for the content range of each size of bubbles indicate our appraisal of where the strength of the core will deteriorate.

Only the relative volume ratio of small and large bubbles discussed below in the text, will allow a core weighing 20–24 lbs/cu.ft.(preferably 22±1 lbs./cu.ft.) to retain sufficient strength for handling and use, while at the same time retaining the characteristics which allow the door containing the core to pass the required tests.

Preferably, in the mixture, large bubbles of between 1 mm and 4 mm are present to displace about 31%–38% of the volume of the core and small bubbles of diameter 80% of which are between 0.01 and 0.25 mm to displace between about 17% to 25% of the volume of the core.

Where diameters are given it is noted that such large or small bubbles, for a variety of reasons tend to form spheres. However they will not always form exact spheres. The diameter ,given is that of a sphere which is equivalent in volume to the space or spheroid.

In the preferred core of the invention, the volume occupied by hydrated gypsum is preferably about 43%; by large bubbles of diameter between 1–4 mm, about 35% of the volume; and by small bubbles, about 80% of which are of diameter between 0.01 and 0.25 mm, about 21% of the volume. Other solids such as additives, the solid residue of bubble forming members, etc.; will be less than about 2% of the volume.

In accord with the preferred method for making a core for fire doors: dehydrated gypsum is mixed with components adapted to form small and large bubbles in the finished core and with sufficient water to hydrate the gypsum and a sufficient excess of water to produce a shapeable mass, where said bubbles; and bubble forming components are sufficient to provide between 54% and 60% of the volume displacement of the mixture so formed, when the gypsum is hydrated, forming said shapeable mass into at least one slab, having on some of its surfaces a wrapping layer, where said slab with said wrapping layer has the desired core dimensions; and eliminating the excess of water.

Preferably said method includes: initially mixing, in a first mixture, dehydrated gypsum with water and a large bubble forming component; mixing water with a small bubble forming component in a second mixture; mixing said first and second mixtures in a final mixture where the total water is sufficient to hydrate the gypsum and provide sufficient excess water in the final mixture to render the mixture into a shapeable mass with some coherency; then forming such mass into a longitudinally extending strip and providing such strip with an outer layer on its sides, where such strip with its outer layer has the width and thickness desired in the finished core; maintaining said strip until hydration of said gypsum has substantially taken place; then cutting said strip into slabs of desired core length; and then heating said slabs to remove uncombined water without substantially dehydrating said gypsum.

FIG. 1 schematically demonstrates the operation of the inventive method from the mixing of the initial components until the formation of core-length slabs from a strip.

FIG. 2 demonstrates an oven for removal of excess water from the strip.

In the preferred method in accord with the invention and dealing with the percentages as defined in the preceding discussions: dehydrated gypsum, the large bubble forming ingredient and any additives are mixed with water. In the first mixer 10 we mix 70 lbs. of calcium sulphate in powdered form, and the large bubble forming agent, (preferably about 2 lbs, of styrene in the form of hollow spheres with a diameter of between 1 and 4 mm) and water.

Other additives may be added to this mix if required. For example, to improve hot strength it may become desireable to add glass frit, silicates or similar material of low melting temperature. To improve toughness or handling characteristics it may become desireable to add mineral fibre or other fibrous material in small quantities. Other components, such as vermiculite, perlite, diatomaceous earth, and the like, in small quantities, may be desireable to control expansion and further improve hot strength.

In the second mixer 12 we mix water and the selected small bubble foaming agent (here Cedepal™) in the amount of 4.2 lbs. which is adapted to form the 0.01 to 0.25 mm small bubbles. The amount of Cedepal and the mixing time and temperature are empirically determined.

The first and second mixtures are then mixed in mixer 14. The quantity of gypsum is selected to provide, with any other solids such as additives or residue from other components, 40%–46% of the final mix, other solids being less than about 2%. The total quantity of water in mixers 10 and 12 is sufficient to form the small bubbles, to hydrate the gypsum and to provide sufficient excess water to render the output of mixer 14 shapeable but having limited coherence.

Any other components for forming the large or small bubbles may be used so long as they do not interact with the gypsum.

The schematically shown apparatus for performing the method includes the travelling conveyor 20. At the upstream end of the conveyor a roll of fibreglass matte 22 is unwound to provide strip 23 to lie on and travel with conveyor 20. The width of the matte is the sum of the width of core desired plus the width of the two side flanges 24 which side flanges 24 include the width of the to-be-formed top strips 26.

Forming means of non stick material, not shown, but conventionally available in a number of forms, will act to shape the matte to form the two side flanges 24. Downstream from the formation of the side flanges, the conveyor frame (not shown) will provide side walls 28 which slid ably support the flanges 24 as the matte is filled with the final mixture and thereafter will support the (matte) side walls of the core.

Just downstream from the upstream end of walls 28, supply and feeding means 30, not shown in detail, provide the final mixture to the matte 20. Thus, optionally, means 34, (shown in dotted outline which may be any conventional non stick means) and shown as downwardly facing edge 35, may be used to level the mix.

Downstream from the filling and levelling of the mix, the conventional forming means, not shown, forms the top flanges 26 from upper strips on the flanges 24 so that the remaining portion 37 of the flange 24 forms the outer layer side walls of the core.

After the formation of the top flanges a roller 40 supplies a strip of fibreglass matte 42 (matte 22 and matte 42 are available from Schuller International Inc. Toledo Ohio.) This matte 42 has the width of the final core and is designed to extend between side walls 37. The matte 42 is, in the vicinity of roll 40, provided with glue, as schematically shown at 44 on what is to be the lower surface of the matte 42, and is laterally located to attach matte 42 to top flanges 26 at pressure roller 46.

The matte 42 is therefore applied and adhered to top flanges 28 and, at the same time the roller 46 finalizes the levelling and shaping of the final mix. It is found preferable in most cases to omit levelling means 34 and rely on roller 46 for the levelling function. The reason is that gypsum may tend to collect and "cake" at the edge 35 interfering with the uniformity of the gypsum in the slabs.

It will be noted that all contacts of the fibreglass matte layer with the formed mix causes some incursions of the glass fibres into the mix. Such movement and incursions, in the final core, will cause mutual adherence of these members and improves the integrity of the core.

The resultant slab 48 with its fibreglass skin travels slowly down the conveyor, while the travelling slab sets, and then before and after setting the formerly dehydrated gypsum in the slab completes the hydration of the gypsum from water in the slab. Some of the excess water in the slab evaporates but most is left.

Downstream from the location where the hydration is complete the slab is cut into lengths 54 corresponding to the desired length for the core. It will be noted that there is, in this example, no layer covering for the core ends where the cut has taken place. However it is found that the slab 54 has acquired, during setting and hydration, enough coherence and integrity to allow handling between this stage and the next. The coherence and integrity is provided by a number of factors: the evaporation of water from, and the setting of the mix in, the slab, and the hydration of the gypsum therein, which supply sufficient integrity for handling the cut slab, and do not require any "skin" or retaining means for the uncovered ends of the cut slab.

The cut slab portions are then placed in a heated oven or enclosure 56 as shown. The heating is carried on at about 150° F. and is not allowed to rise materially higher to avoid the risk of "calcining" or "dehydrating" gypsum in locations of higher heat, during the heating process. The heating is continued until the excess water is driven off and only the "combined" water in the hydrated gypsum remains. The heating must be then stopped to avoid a risk of calcining or dehydrating the gypsum. The point at which the excess water is driven off may be reasonably accurately determined since with a heating environment of 150° F. the temperature of the core will remain below 150° F. until the excess water is removed. As the excess water is removed, the temperature of the core will start to increase toward that of the heater environment.

Whatever method of heating is used it will be necessary to provide for air or gas flow into and out of the heating area to avoid the effects on the process of an excess of humidity, caused by the excess water driven off from the cores.

The core, with substantially all the uncombined water removed, may then be combined with the door shell to form a complete door.

Although the above is the presently preferred method, other methods, within the scope of the invention may be used.

The resultant core will have a preferred composition of about: 43% hydrated gypsum, 1% other solids, 35% large bubbles (1–4 mm) and 21% small bubbles (80% of which) (0.01–0.25 mm). Such a core in dimensions of about 34½"× 81½"(nominally 3'×7') and a thickness of about 1⅝", in a steel door will, (if heated to 1000° C. on one side), maintain the temperature on the cool side of the door to less than 250° C. for at least 60 minutes (test (1) above). A door with such core will preserve its structural integrity (of the shell since the core will be dehydrated or calcined) for a further 30 minutes.

The invention may be used for fire door cores which pass other tests either more or less stringent than the test used as an example. They may also be designed to pass a test analogous to (although more or less stringent than) step (1) without passing the step (2) test or equivalent. (Such as in a wooden door.) For these broader aspects the proportions and quantities of the ingredients will be limited only by the teaching herein, as defined in the claims.

Additives for better fire resistance or any other purpose may be added within the limits set out.

We claim:

1. A core for fire doors, comprising the mixture of: hydrated gypsum occupying 40%–46% of the core volume, the remainder of the core volume being large bubbles which are between 1 and 4 mm, small bubbles of about 80% of which are between 0.01 and 0.25 mm, and other components where the large bubbles occupy about 31%–38% of the core volume, and the small bubbles occupy about 17% to 25% of the core volume, 2. A core as claimed in claim 1 wherein 80% of said large bubbles are between 2.2 mm and 3 mm.

3. A core as claimed in claim 1 wherein said hydrated gypsum occupies about 43% of the core volume, said large bubbles occupy about 35% of the core volume, and said small bubbles occupy about 21% of the core volume, 4. A core as claimed in claim 2 wherein said hydrated gypsum occupies about 43% of the core volume, said large bubbles occupy about 35% of the core volume, and said small bubbles occupy about 21% of the core volume.

5. A core as claimed in claim 1 where said large bubbles are formed of styrene spheroids.

6. A core as claimed in claim 2 where said large bubbles are formed of styrene spheroids.

7. A core as claimed in claim 3 where said large bubbles are formed of styrene spheroids.

8. A core as claimed in claim 4 where said large bubbles are formed of styrene spheroids.

* * * * *